United States Patent Office 3,085,861
Patented Apr. 16, 1963

3,085,861
PREPARATION OF SILICEOUS PIGMENT
Fred S. Thornhill, Akron, Ohio, and Raymond S. Chisholm, Pittsburgh, Pa., assignors, by mesne assignments, to Pittsburgh Plate Glass Company
No Drawing. Filed Apr. 8, 1955, Ser. No. 500,302
The terminal portion of the term of the patent subsequent to Dec. 30, 1976, has been disclaimed and dedicated to the public
5 Claims. (Cl. 23—182)

This invention relates to the production of finely divided silica which can be recovered in pulverulent state and which can be used as a rubber reinforcing pigment or as a paper pigment. Prior to the present invention it has been known that $SiO_2$ could be prepared by reaction of alkali metal silicate with acids. To a large degree, the silica products thus prepared have been commonly recognized as "gels." That is, when the acid has been reacted with the sodium silicate, a gel-like reaction product has been obtained. This product, when dried by ordinary means, forms a very hard, quite porous product. In some cases, special methods have been required in order to effect the drying and to obtain a satisfactory product.

Silicas prepared as above described normally have surface areas of 300 to 800 square meters per gram. Because of their high porosity, these materials more commonly are used for the purpose of catalyst supports or for adsorption purposes. They are unsuitable, as a general rule, for use as rubber reinforcing pigments or as opacifying pigments in paper.

In the course of many of the experiments which ultimately have resulted in the present invention, it has been discovered that a satisfactory silica useful as a reinforcing rubber pigment and/or as an opacifying paper pigment can be prepared by adding an acid to a pool of sodium silicate of predetermined silica concentration over a period of substantial time, for example, one or more hours. Such a process is highly satisfactory and economically competitive. However, the relatively long time which is required for the reaction to take place has obvious disadvantages.

According to the present invention it has been found that finely divided silica of the type herein contemplated may be prepared efficiently and in a very short time. Thus, in the practice of the present invention, silica has been prepared by introducing an acid which forms a water soluble alkali metal salt, i.e., a salt having a solubility in water of at least 1 gram per 100 milliliters of water, into an aqueous alkali metal silicate solution at a rate such that the introduction of the stoichiometric amount of acid required to react with the alkali metal silicate is added within a period substantially less than 10 minutes, preferably less than 1 to 2 minutes, while maintaining the alkali metal solution at a superatmospheric pressure and at a temperature above 100° C., for example about 125° C.–300° C.

The term "stoichiometric amount of acid," as used herein, is intended to mean the amount of acid which is required to react with the alkali metal silicate to produce the normal or neutral salt of the alkali metal. That is, with respect to carbon dioxide, it is the stoichiometric amount of carbon dioxide which will react with sodium silicate to produce silica and the sodium carbonate $Na_2CO_3$ as distinguished from the sodium bicarbonate $NaHCO_3$.

The process may be conducted in any convenient way according to which the sodium silicate is kept in a reaction zone under pressure and the acid is introduced within the time specified. Thus, it is possible to introduce the sodium silicate into an autoclave and to pump the acid into the autoclave while a substantial superatmospheric pressure has been established therein. Alternatively, the process may be conducted substantially continuously by introducing the acid and the sodium silicate under pressure into a small mixing chamber capable of withstanding the pressure and removing the resulting product from the chamber.

The time within which the acid is added to the sodium silicate or like alkali metal silicate is quite important. Preferably, the introduction should be effected within a matter of a very few seconds or at least less than 1 to 2 minutes. In order to effect this result, the temperature should be above 100° C., as stated above. For most efficient action, temperatures in the range of 150° C. to about 300° C. are preferred. This is true because the reaction tends to occur much more rapidly at the higher temperatures and therefore the process can be conducted in a shorter time.

As a consequence of the addition of the acid, a water soluble alkali metal salt of said acid is formed and silica is precipitated. The concentration of the metal of such salt normally remains above about 0.2 mole per liter, the exact concentration depending upon the concentration of the silicate solution subjected to treatment. In general it is desirable to use a solution in which the $Na_2O$ content of the silicate exceeds 15 grams per liter. In such a case the alkali metal content of the solution remains above about 0.5 mole per liter.

The pressure of the reaction mixture may be the autogenous pressure of the system. That is, as the temperature rises above about 100° C., the pressure created by the reaction mixture exceeds atmospheric. It will be understood, of course, that pressures higher than the autogenous pressure of the system may be used if desired. Where the acid used is gaseous recourse to substantially higher pressures due to the partial pressure of the acidic gas is advantageous to ensure rapid reaction.

In order to prevent excessive rise in the surface area, the addition of acid normally should be discontinued before the pH of the reaction mixture falls below 5. That is, if an excess of acid is added and the pH of the reaction mixture therefor falls below 5, the surface area of the pigment tends to go up. Where such increase in surface area is undesirable, avoidance of excess of acid should be ensured or the excess acid should be neutralized before the silica is recovered.

The alkali metal silicate used normally should have the composition $M_2O(SiO_2)_x$ where $x$ is 2 or above, usually in the range of 2 to 4, including fractional numbers, preferably in the range of 3 to 4. In the above formula, M is an alkali metal such as sodium, potassium or the like. The large amount of acid required to neutralize compositions wherein the ratio of $SiO_2$ to $Na_2O$ is less than 2 makes this process objectionable from the economic standpoint although the process is operative. Silicate solutions containing about 10 to 150 grams per liter of $SiO_2$ may be subjected to the reaction herein contemplated. Preferably, the $SiO_2$ content should not exceed about 150 grams per liter since, in higher concentration, there is a serious tendency to form a viscous reaction mixture which is difficult to handle.

Because of the time of neutralization required is quite short small variations in time tend to produce gels or inferior pigments. In large scale operation, avoidance of variation in time of neutralization is difficult because of difficulties in achieving uniform mixing of the reactants. The adverse consequences of these difficulties may be minimized or even avoided by use of a relatively concentrated alkali metal silicate solution containing at least about 0.5 mole per liter of alkali metal. Thus, it is desirable to use sodium silicate solution containing in excess of about 12–15 grams of $Na_2O$ per liter of solution. In such a case, the silica concentration generally exceeds 30 grams of $SiO_2$ per liter.

If desired, the sodium silicate solutions may contain 5 to 80 grams per liter of an alkali metal salt such as sodium chloride, sodium sulphate, sodium nitrate or like salt of a water soluble acid which has a dissociation content above about 0.01.

Any convenient acid or acidic material which is soluble in water may be used to effect the reaction herein contemplated. Such acids include hydrochloric acid, sulfuric acid, phosphoric acid, sulphurous acid, nitric acid, carbonic acid or carbon dioxide, as well as the acidic or partially neutralized alkali metal or ammonium salts of such acids, such as sodium bicarbonate, ammonium bicarbonate, sodium acid sulphate, disodium acid phosphate, and the like. Gaseous acids or acid anhydrides, such as $SO_2$, $HCl$, $H_2S$, $CO_2$, chlorine, and the like, can be used readily.

The resulting silica produced has a particle size ranging from 0.02 to 0.4 micron, as measured by the electron microscope. Such silica normally is in the form of flocs of such particles. The size of these flocs may be substantial, usually ranging from about 1 to 5 microns. The flocs may be readily broken up by the milling which normally takes place when silica of this character is incorporated in rubber.

The surface area of this silica usually ranges from about 15 to 200 square meters per gram, measured by the Brunauer-Emmett-Teller method of determining surface area.

The following examples are illustrative:

Example I

Two liters of sodium silicate solution containing the sodium silicate $Na_2O(SiO_2)_{3.3}$, in a concentration such that the $Na_2O$ content of the sodium silicate was 10.15 grams per liter, was placed in an autoclave. The stoichiometric amount of carbon dioxide, required to react with the sodium silicate and to produce $Na_2CO_3$, was introduced into this solution while the temperature of the solution was held at 200° C. within a period of 30 seconds. A fluid slurry of silica was produced. This slurry was filtered and the silica was washed with 50 cubic centimeters of concentrated sulphuric acid. The precipitated silica was recovered by filtering and drying at 105° C. The product was a finely divided silica having a surface area of about 72 square meters per gram and a pH of 6.0.

Example II

The process of Example I was repeated using sodium silicate solution containing 20.3 grams of $Na_2O$ per liter as sodium silicate. The stoichiometric amount of carbon dioxide was introduced into the solution in 50 seconds while the silicate solution was at a temperature of 200° C. The resulting slurry was filtered and the cake washed with 100 cubic centimeters of concentrated sulphuric acid and the cake dried at 105° C. The resulting product was a finely divided silica having a surface area of 32 square meters per gram.

Example III

The process of Example I was repeated except that the temperature of the carbonation was 150° C. The surface area of the silica thus produced was 171 square meters per gram.

Example IV

The process of Example II was repeated except that the temperature of the reaction mixture was 150° C. The silica thus produced had a surface area of 164 square meters per gram.

Example V

Six liters of sodium silicate containing 20.3 grams of $Na_2O$ per liter was placed into an autoclave. The stoichiometric amount of carbon dioxide required to produce $Na_2CO_3$ was added to the sodium silicate in the time and at the temperature set forth in the table below. The resulting slurry was filtered and the silica adjusted to the pH set forth by means of hydrochloric acid and dried at 105° C. The resulting silicas were incorporated in GR–S rubber and the tensile and tear strengths of the resulting rubber were determined. The results were as follows:

| Temperature of Silicate Solution, ° C. | Time of Acidification, Seconds | pH of Silica | BET surface area of silica obtained, square meters per gram | Tensile strength, pounds per square in. | Tear strength, pounds per inch thickness |
|---|---|---|---|---|---|
| 150 | 20–30 | 7.3 | 80 | 3,260 | 550 |
| 150 | 10–15 | 8.5 | 90 | 3,350 | 500 |
| 200 | 5–6 | 7.8 | 39 | 2,670 | 440 |
| 200 | 2–3 | | 30 | | |
| 150 | 2–3 | | 105 | | |

The above examples illustrate the rapidity within which the reaction should be conducted. Generally speaking, the higher the temperature the higher the concentration of silica the shorter the time of neutralization for production of silica of the same general process. Thus, the reaction may be conducted substantially instantaneously by mixing stoichiometric amounts of aqueous acid of sodium silicate containing 20–30 grams of $Na_2O$ as sodium silicate per liter, heated to a temperature of 250° C. to 300° C. or by pouring the preheated silicate solution into the aqueous acid, for example, sulphuric acid, also preheated to 250° C. to 300° C. If desired, the silicate solution may contain up to 70 grams per liter of NaCl.

Normally, the acid is added to the alkali metal silicate solution in order to ensure production of silica at a pH of 7 or above. However, when the silica is precipitated by adding hot silicate to a pool of the hot acid, the pH of the resulting silica may be adjusted to 5 or above if desired. Thus, a solution containing $Na_2O(SiO_2)_{3.3}$ in the concentration of 20 to 30 grams of $Na_2O$ per liter heated to 250° C. may be added directly to a pool of sulphuric acid or like acid and at a temperature of 250° C., or two flowing streams thereof may be mixed in substantially stoichiometric proportions or with the silicate in slight (5–10 percent) excess. Such sodium silicate solution may contain, if desired, 20, 30 or even 50 grams of NaCl per liter. In such a case the reaction is essentially instantaneous.

Although the present invention has been described with reference to the specific details of certain embodiments, it is not intended that such embodiments shall be regarded as limitations upon the scope of the invention except insofar as included in the accompanying claims.

We claim:

1. A method of preparing finely divided precipitated siliceous pigment which comprises introducing an acid which forms a water soluble salt of an alkali metal into an aqueous alkali metal silicate solution at a rate such that the stoichiometric amount of acid required to react with the alkali metal silicate is added and reacted with the alkali metal silicate to precipitate permanently the $SiO_2$ content of the alkali metal silicate as siliceous pigment within a period less than 2 minutes, while maintaining the solution at a superatmospheric pressure and at a temperature above 100° C.

2. A method of preparing a finely divided precipitated siliceous pigment which comprises introducing an acid which forms a water soluble salt of an alkali metal into an aqueous sodium silicate solution at a rate such that the stoichiometric amount of acid required to react with the sodium silicate is added and reacted with the alkali metal silicate to precipitate permanently the $SiO_2$ content of the alkali metal silicate as siliceous pigment within a period of less than 2 minutes, while maintaining the solution at a superatmospheric pressure and at a temperature above 100° C.

3. The process of claim 2 wherein the sodium silicate solution contains up to 150 grams of $SiO_2$ per liter and in excess of 0.5 mole of sodium per liter.

4. The method of claim 1 wherein the temperature is from 100° C. to 300° C. and the pressure is at least the autogenous pressure of the system.

5. A method of preparing finely divided precipitated siliceous pigment which comprises mixing a water soluble acid which forms a water soluble salt of an alkali metal with an aqueous alkali metal silicate solution at a rate such that the stoichiometric amount of acid required to react with alkali metal silicate is added and reacted with the alkali metal silicate to precipitate permanently the $SiO_2$ content of the alkali metal silicate as siliceous pigment within a period of less than one minute while maintaining the solution at a superatmospheric pressure and at a temperature above 150° C.

References Cited in the file of this patent

UNITED STATES PATENTS

| | | |
|---|---|---|
| 2,496,736 | Maloney | Feb. 7, 1950 |
| 2,663,650 | Iler | Dec. 22, 1953 |
| 2,679,463 | Alexander et al. | May 25, 1954 |
| 2,737,446 | Hoffmann et al. | Mar. 6, 1956 |
| 2,759,798 | Waring et al. | Aug. 21, 1956 |

FOREIGN PATENTS

| | | |
|---|---|---|
| 561,750 | Great Britain | June 2, 1944 |

OTHER REFERENCES

Chemical Engineers' Handbook, by Perry, 3rd ed., 1950, page 1257, lines 14–18, column 2.

UNITED STATES PATENT OFFICE
CERTIFICATE OF CORRECTION

Patent No. 3,085,861                                         April 16, 1963

Fred S. Thornhill et al.

It is hereby certified that error appears in the above numbered patent requiring correction and that the said Letters Patent should read as corrected below.

Column 3, line 4, for "solutions" read -- solution --; line 9, for "conventient" read -- convenient --.

Signed and sealed this 11th day of August 1964.

SEAL)
Attest:

ERNEST W. SWIDER                                       EDWARD J. BRENNER
Attesting Officer                                           Commissioner of Patents